United States Patent
Vaidya et al.

(10) Patent No.: US 9,413,666 B2
(45) Date of Patent: Aug. 9, 2016

(54) REPORTING RADIO ACCESS NETWORK CONGESTION INFORMATION IN A NETWORK SHARING ENVIRONMENT

(71) Applicant: CISCO TECHNOLOGY, INC., San Jose, CA (US)

(72) Inventors: Maulik Vijay Vaidya, Atlanta, GA (US); Thomas Wayne Anderson, Naperville, IL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 332 days.

(21) Appl. No.: 14/044,734

(22) Filed: Oct. 2, 2013

(65) Prior Publication Data

US 2015/0092576 A1    Apr. 2, 2015

(51) Int. Cl.
  *H04L 12/801*  (2013.01)
  *H04L 12/24*  (2006.01)
(52) U.S. Cl.
  CPC ............ *H04L 47/11* (2013.01); *H04L 41/5032* (2013.01); *H04L 47/14* (2013.01)
(58) Field of Classification Search
  None
  See application file for complete search history.

(56) References Cited

U.S. PATENT DOCUMENTS

| | | | |
|---|---|---|---|
| 5,432,907 A | 7/1995 | Picazo et al. |
| 6,094,578 A | 7/2000 | Purcell et al. |
| 6,108,789 A | 8/2000 | Dancs et al. |
| 6,185,205 B1 | 2/2001 | Sharrit et al. |
| 6,233,315 B1 | 5/2001 | Reformato et al. |
| 6,385,651 B2 | 5/2002 | Dancs et al. |
| 6,745,246 B1 | 6/2004 | Erimli et al. |
| 6,813,250 B1 | 11/2004 | Fine et al. |
| 6,912,389 B2 | 6/2005 | Bright et al. |
| 7,072,952 B2 | 7/2006 | Takehiro et al. |
| 7,339,900 B2 | 3/2008 | Perlman |
| 7,345,991 B1 | 3/2008 | Shabtay et al. |
| 7,352,707 B2 | 4/2008 | Ho et al. |

(Continued)

FOREIGN PATENT DOCUMENTS

| | | |
|---|---|---|
| CN | 102158896 | 8/2011 |
| WO | WO2012/038911 | 3/2012 |
| WO | WO2013/167190 | 11/2013 |

OTHER PUBLICATIONS

USPTO Oct. 27, 2014 Notice of Allowance from U.S. Appl. No. 12/539,446.

(Continued)

*Primary Examiner* — Steven H Nguyen
(74) *Attorney, Agent, or Firm* — Patent Capital Group

(57) ABSTRACT

A method is provided in one example embodiment and includes detecting user plane congestion at an eNodeB in connection with subscribers of a first one of a plurality of public land management networks ("PLMNs") sharing a radio access network ("RAN"), identifying one or more of the PLMNs to be notified of the detected congestion in accordance with an agreement between the PLMNs, and reporting RAN congestion information ("RCI") regarding the detected congestion to only the identified one or more of the PLMNs. The detecting may comprise determining whether detected user plane congestion exceeds a first congestion threshold indicated for the first one of the PLMNs. The method may further comprise terminating the RCI reporting when the detected congestion falls below a second congestion threshold specified for the first one of the PLMNs. The first and second thresholds may be indicated in a table associated with the eNodeB.

19 Claims, 5 Drawing Sheets

(56) References Cited

U.S. PATENT DOCUMENTS

| | | |
|---|---|---|
| 7,369,513 B1 | 5/2008 | Sankaran |
| 7,460,492 B2 | 12/2008 | Portolani et al. |
| 7,463,597 B1 | 12/2008 | Kompella |
| 7,555,546 B1 | 6/2009 | Anumala |
| 7,574,202 B1 | 8/2009 | Tsao et al. |
| 7,685,295 B2 | 3/2010 | Myers et al. |
| 7,724,656 B2 | 5/2010 | Sagfors |
| 8,064,480 B2 | 11/2011 | Bitter et al. |
| 8,089,963 B2 | 1/2012 | Melman et al. |
| 8,112,330 B1 | 2/2012 | Grandcolas et al. |
| 8,121,598 B2 | 2/2012 | Hamel et al. |
| 8,130,655 B2 | 3/2012 | Foottit |
| 8,140,081 B2 | 3/2012 | Barrett et al. |
| 8,194,556 B2 | 6/2012 | Tacconi et al. |
| 8,208,933 B1 | 6/2012 | Talley et al. |
| 8,335,161 B2 | 12/2012 | Foottit |
| 8,400,921 B2 | 3/2013 | Grayson et al. |
| 8,914,520 B2 | 12/2014 | Grayson et al. |
| 8,965,380 B2 | 2/2015 | Hratko et al. |
| 2002/0191572 A1 | 12/2002 | Weinstein et al. |
| 2005/0118946 A1 | 6/2005 | Colban et al. |
| 2005/0201406 A1 | 9/2005 | Sekine et al. |
| 2005/0223111 A1 | 10/2005 | Bhandaru et al. |
| 2005/0256969 A1 | 11/2005 | Yancey et al. |
| 2006/0050667 A1 | 3/2006 | Verma et al. |
| 2006/0199591 A1 | 9/2006 | Klatt |
| 2006/0281471 A1 | 12/2006 | Shaffer et al. |
| 2007/0183404 A1 | 8/2007 | Hofer |
| 2007/0264986 A1* | 11/2007 | Warrillow .......... H04L 12/5695 455/414.3 |
| 2008/0084822 A1 | 4/2008 | Sagfors |
| 2008/0095086 A1 | 4/2008 | Linkola et al. |
| 2008/0101301 A1 | 5/2008 | Thomas et al. |
| 2008/0155094 A1 | 6/2008 | Roese et al. |
| 2008/0253342 A1 | 10/2008 | So et al. |
| 2009/0005053 A1 | 1/2009 | Agin |
| 2009/0059795 A1 | 3/2009 | Fonseca et al. |
| 2009/0113069 A1 | 4/2009 | Prabhakar et al. |
| 2009/0163216 A1 | 6/2009 | Hoang et al. |
| 2009/0219888 A1 | 9/2009 | Chen et al. |
| 2010/0075658 A1 | 3/2010 | Hou et al. |
| 2010/0093351 A1 | 4/2010 | Barrett et al. |
| 2010/0113032 A1 | 5/2010 | Lee et al. |
| 2010/0113035 A1 | 5/2010 | Eskicioglu et al. |
| 2010/0165960 A1 | 7/2010 | Richardson |
| 2010/0208591 A1 | 8/2010 | Corliano |
| 2010/0232293 A1 | 9/2010 | Sagfors |
| 2010/0267386 A1 | 10/2010 | Lim et al. |
| 2010/0290398 A1 | 11/2010 | Chaudhary et al. |
| 2011/0021196 A1 | 1/2011 | Grayson et al. |
| 2011/0039560 A1 | 2/2011 | Hratko et al. |
| 2011/0082924 A1 | 4/2011 | Gopalakrishnan |
| 2011/0105129 A1 | 5/2011 | Kim et al. |
| 2011/0119740 A1 | 5/2011 | Grayson et al. |
| 2011/0170408 A1 | 7/2011 | Furbeck et al. |
| 2011/0194534 A1 | 8/2011 | Carmon et al. |
| 2011/0299395 A1 | 12/2011 | Mariblanca |
| 2012/0051216 A1 | 3/2012 | Zhang et al. |
| 2012/0096159 A1 | 4/2012 | Short et al. |
| 2013/0303114 A1* | 11/2013 | Ahmad ................... H04W 4/26 455/406 |
| 2014/0022904 A1* | 1/2014 | Ahmad ............. H04W 28/0289 370/235 |
| 2015/0156666 A1 | 6/2015 | Won |

OTHER PUBLICATIONS

U.S. Appl. No. 13/551,374, filed Jul. 17, 2012, entitled "System and Method for Indicating a Level of RAN Congestion for User Plane Traffic in a Network Environment," Inventor(s): Nirav Salot et al.
USPTO Nov. 9, 2011 Nonfinal Office Action from U.S. Appl. No. 12/539,446.
USPTO Feb. 7, 2011 Response to Nov. 9, 2011 Nonfinal office Action from U.S. Appl. No. 12/12/539,446.
USPTO Feb. 29, 2012 Final Office Action from U.S. Appl. No. 12/539,446.
USPTO Apr. 20, 2012 Request for Continued Examination in response to Feb. 29, 2012 Final Office Action from U.S. Appl. No. 12/539,446.
USPTO Jun. 20, 2012 Non-Final Office Action from U.S. Appl. No. 12/539,446.
USPTO Sep. 13, 2012 Response to Jun. 20, 2012 Non-Final Office Action from U.S. Appl. No. 12/539,446.
USPTO Dec. 17, 2012 Non-Final Office Action from U.S. Appl. No. 12/539,446.
USPTO Mar. 11, 2013 Response to Non-Final Office Action dated Dec. 17, 2012 from U.S. Appl. No. 12/539,446.
USPTO Jun. 6, 2013 Final Office Action from U.S. Appl. No. 12/539,446.
USPTO Sep. 5, 2013 RCE Response to Jun. 6, 2013 Final Office Action from U.S. Appl. No. 12/539,446.
USPTO Jul. 16, 2012 Non-Final Office Action from U.S. Appl. No. 12/619,273.
USPTO Oct. 15, 2012 Response to Jul. 16, 2012 Non-Final Office Action from U.S. Appl. No. 12/619,273.
USPTO Nov. 28, 2012 Final Office Action from U.S. Appl. No. 12/619,273.
USPTO Feb. 26, 2013 RCE Response to Nov. 28, 2012 Final Office Action from U.S. Appl. No. 12/619,273.
USPTO Sep. 28, 2012 Non-Final Office Action from U.S. Appl. No. 12/726,224.
USPTO Dec. 26, 2012 Response to Sep. 28, 2012 Non-Final Office Action from U.S. Appl. No. 12/726,224.
USPTO Jan. 23, 2013 Notice of Allowance from U.S. Appl. No. 12/726,224.
USPTO Jun. 4, 2014 Final Office Action from U.S. Appl. No. 13/551,374.
USPTO Aug. 29, 2014 Notice of Allowance from U.S. Appl. No. 12/619,273.
USPTO Jun. 5, 2014 Non-Final Office Action from U.S. Appl. No. 12/539,446.
USPTO May 18, 2015 Non-Final Office Action from U.S. Appl. No. 13/551,374.
USPTO Apr. 10, 2014 Non-Final Office Action from U.S. Appl. No. 12/619,273.
USPTO Dec. 20, 2013 Non-Final Office Action from U.S. Appl. No. 13/551,374.
Adrangi, F., et al., Identity Selection Hints for the Extensible Authentication Protocol (EAP); RFC 4284; Jan. 2006; http://ietfreport.isoc.org/rfc/PDF/rfc4284.pdf; 15 pages.
Berry, B., et al., PPP Over Ethernet (PPoE) Extensions for Credit Flow and Link Metrics; RFC 4938; Jun. 2007; http://www.ietf.org/rfc/rfc4938.txt.pdf; 18 pages.
Broadband Forum, "TR-196 Femto Access Point Service Data Model," Issue 1; Issue Date: Apr. 2009; 131 pages.
Chandrasekhar, V. and J.G.Andrews, "Femtocell Networks: A Survey," The University of Texas at Austin; A. Gatherer, Texas Instruments; Jun. 28, 2008; 23 pages.
Kineto Wireless, Inc., "UMA: The 3GPP Standard for Femtocell-to-Core Network Connectivity," Aug. 2007; 9 pages.
Positron Public Safety Systems, "Product Specifications: Power Radio," http://www.positron911.com/products/powerRADIO/powerRADIO_specs.asp, Dec. 18, 2008, 2 pages.
Thunder Eagle, Inc.—Radio Wireless Alerting Systems, "MRI-100™ : Multi Radio Interface," http://www.thuneagle.com/mri100.htm, Dec. 18, 2008, 2 pages.
Wikipedia, "Distributed minimum spanning tree," http://en.wikipedia.org/wiki/Distributed_minimum_spanning_tree, Dec. 18, 2008, 2 pages.
Wikipedia, "Minimum spanning tree," http://en.wikipedia.org/wiki/Minimum_spanning_tree, Dec. 18, 2008, 5 pages.
Wikipedia, "Plectron," http://en.wikipedia.org/wiki/Plectron, Dec. 18, 2008, 2 pages.
USPTO Sep. 9, 2015 Final Office Action from U.S. Appl. No. 13/551,374.

* cited by examiner

FIG. 4

| PLMN ID | DEDICATED ||||  SHARED |||||
|---|---|---|---|---|---|---|---|---|---|
| | DEDICATED CAPACITY | RCI REPORTING START | RCI REPORTING STOP | PLMNs TO RECEIVE RCI REPORTING | SHARED CAPACITY | IDENTITY OF SHARING PLMN | RCI REPORTING START | RCI REPORTING STOP | PLMNs TO RECEIVE RCI REPORTING |
| A | 60% | 45 | 35 | A,B | | | | | |
| B | 40% | 25 | 20 | B | | | | | |

FIG. 5

| PLMN ID | DEDICATED ||||  SHARED |||||
|---|---|---|---|---|---|---|---|---|---|
| | DEDICATED CAPACITY | RCI REPORTING START | RCI REPORTING STOP | PLMNs TO RECEIVE RCI REPORTING | SHARED CAPACITY | IDENTITY OF SHARING PLMN | RCI REPORTING START | RCI REPORTING STOP | PLMNs TO RECEIVE RCI REPORTING |
| A | 30% | 25 | 20 | A | 40% | B | 30 | 25 | A,B |
| B | 30% | 25 | 20 | B | 40% | A | 30 | 25 | B |

REPORTING RADIO ACCESS NETWORK CONGESTION INFORMATION IN A NETWORK SHARING ENVIRONMENT

RELATED APPLICATION

This disclosure is related to U.S. patent application Ser. No. 13/551,374, filed Jul. 17, 2012, and entitled "SYSTEM AND METHOD FOR INDICATING A LEVEL OF RAN CONGESTION FOR USER PLANE TRAFFIC IN A NETWORK ENVIRONMENT, which is assigned to the assignee of the present disclosure and incorporated by reference in its entirety.

TECHNICAL FIELD

This disclosure relates in general to the field of communications and, more particularly, to reporting radio access network ("RAN") congestion information in a network sharing environment, such as a Multi-Operator Core Network ("MOCN") environment.

BACKGROUND

Although the data capacity of 3GPP networks has increased significantly since its initial development, user traffic continues to outpace the growth in capacity, resulting in increased network congestion and degraded user service. In particular, the explosion of Internet data traffic, especially the growing portion of the traffic traversing mobile networks, has caused much of the congestion currently being experienced. This explosion is partly attributable to the increase in the number of users using smart phone devices possessing 3G/4G capabilities together with large screens and various Internet applications, such as browsers and video and audio streaming applications. Additionally, laptops and tablets with 3G/4G access capabilities are a major source of mobile data traffic. An annual growth rate of 50% is expected to continue, with growth likely to continue outpacing the increase in infrastructure needed to handle it.

A primary point of congestion in 3GPP networks is the radio access network ("RAN") nodes (e.g., nodeB and radio network controller ("RNC") or eNodeB ("eNB")). In particular, because radio spectrum is the most expensive resource for a local authority to acquire and control, it is difficult for an operator to easily upgrade its radio capacity. Hence the radio congestion for user plane traffic is effectively unavoidable. During periods of radio congestion due to user plane traffic, the RAN nodes may attempt to throttle, or limit, user data packets based on the quality of service ("QoS") profile of the radio bearer; however, RAN nodes are unable to provide application-based differential treatment. Moreover, user data packets are not throttled by RAN nodes until after those packets have already traversed the network between the PDN gateway ("PGW") and the RAN nodes, resulting in inaccurate accounting and unnecessary increase in backhaul load.

Network sharing environments, such MOCN environments, have special considerations associated therewith that should be taken into account by congestion reporting solutions. For example, if a particular eNB is being shared by two Public Land Mobile Networks ("PLMNs"), respectively designated PLMN A and PLMN B, in a manner that A and B have independent core networks and the eNB experiences congestion, then absent prior written consent, B should not be informed about congestion being experienced by A's users and vice-versa.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 illustrates an example configuration table for use in implementing a technique for reporting RAN congestion information ("RCI") in a network sharing environment, such as an MOCN, in accordance with an embodiment of the present disclosure;

FIG. 5 illustrates another example configuration table for use in implementing a technique for reporting RCI in a network sharing environment, such as an MOCN, in accordance with an embodiment of the present disclosure.

DETAILED DESCRIPTION OF EXAMPLE EMBODIMENTS

OVERVIEW

A method is provided in one example embodiment and includes detecting user plane congestion at an eNodeB in connection with subscribers of a first one of a plurality of public land management networks ("PLMNs") sharing a radio access network ("RAN"), identifying one or more of the PLMNs to be notified of the detected congestion in accordance with an agreement between the PLMNs, and reporting RAN congestion information ("RCI") regarding the detected congestion to only the identified one or more of the PLMNs. The detecting may comprise determining whether detected user plane congestion exceeds a first congestion threshold indicated for the first one of the PLMNs. The method may further comprise terminating the RCI reporting when the detected congestion falls below a second congestion threshold specified for the first one of the PLMNs. The first and second thresholds may be indicated in a table associated with the eNodeB. The identified one or more of the PLMNs may include the first one of the PLMNs. The identified one or more of the PLMNs may also include an owner of the RAN. The agreement may comprise a Service Level Agreement ("SLA"). In certain embodiments, the identifying may comprise referring to an entry in a table associated with the eNodeB, wherein the entry corresponds to the first one of the PLMNs.

EXAMPLE EMBODIMENTS

Figure 1:
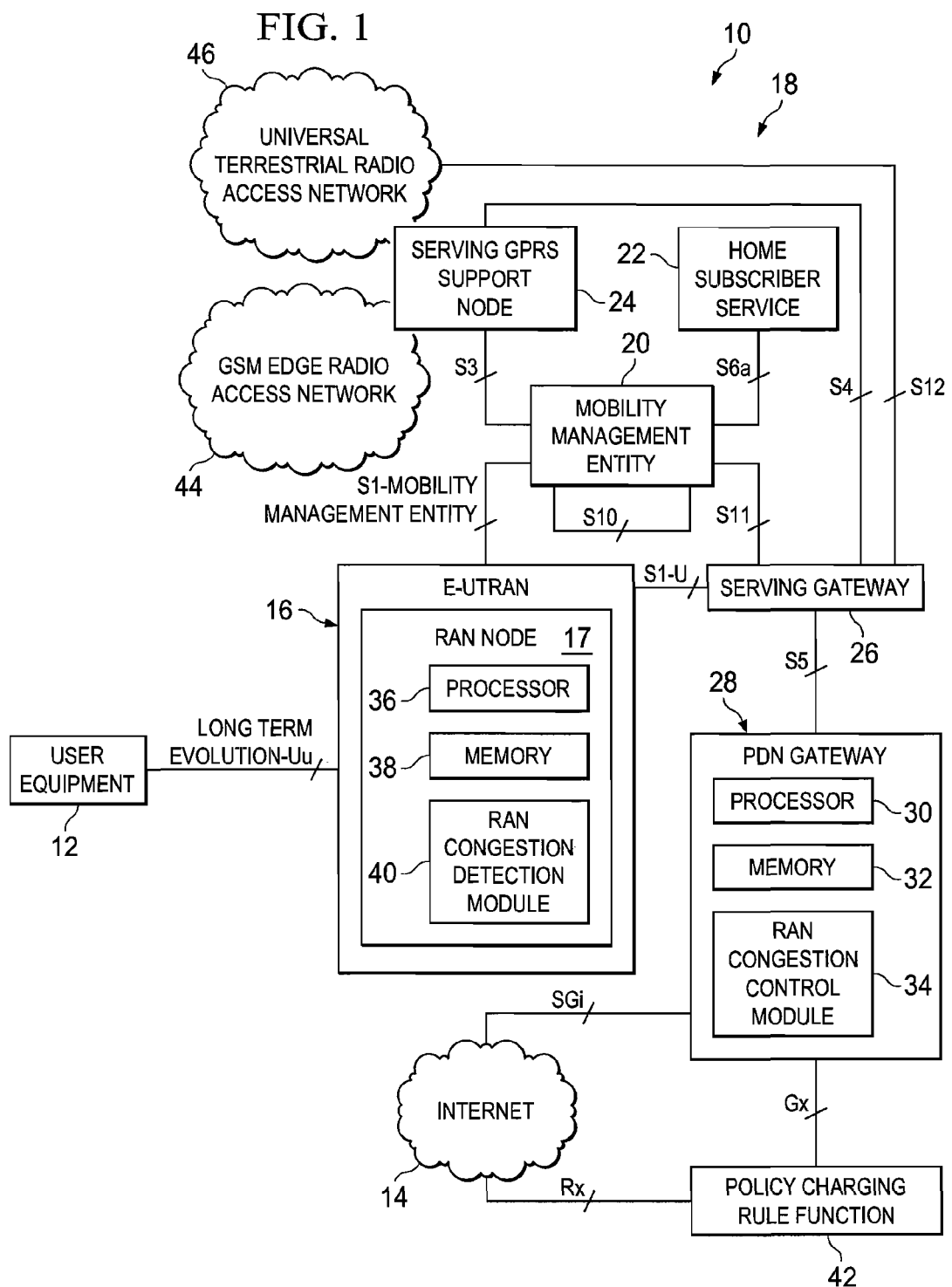
FIG. 1 is a simplified block diagram of an example communication system in which a technique for reporting RAN congestion information in a network sharing environment in accordance with an embodiment of the present disclosure may be implemented.

Turning to FIG. 1, FIG. 1 is a simplified block diagram of a communication system 10 for reporting RAN congestion information in a network sharing environment, such as MOCN, in accordance with an embodiment of the present disclosure. As illustrated in FIG. 1, the system 10 may include user equipment ("UE") 12 that may be connected to communicate data to and from the Internet 14 via a radio access network ("RAN") 16 comprising a plurality of RAN nodes, represented in FIG. 1 by a RAN node 17, and a core network 18. In one embodiment, the RAN 16 is implemented as an E-UTRAN, in which the RAN nodes comprise eNBs; however, it will be recognized that the RAN 16 may also be implemented using radio network controllers ("RNCs") in combination with NodeBs instead of eNBs for the RAN nodes. In one embodiment, the core network 18 may be implemented using an Evolved Packet Core ("EPC") network as defined in 3GPP TS 23.401 and employing a user plane protocol GTPv1-U. It will be understood, however, that other implementations of the core network 18 may be employed in accordance with the features described herein.

As illustrated in FIG. 1, the core network 18 may include a mobility management entity ("MME") 20, which is responsible for control plane functions related to subscriber and session management and is connected to a home subscriber service ("HSS") 22, which supports a database that includes user subscription information, through an S6a interface. The core network 18 may further include a serving GPRS support node ("SGSN") 24 connected to the MME 20 via an S3 interface for providing functionality related to packet-data switching.

The core network 18 may further include a serving gateway ("SGW") 26, which is the termination point of the user plane interface 51-U toward the RAN network 16, and a PDN gateway ("PGW") 28, which supports policy enforcement features that apply operator-defined rules for resource allocation and usage, as well as packet filtering and inspection and charging support. In one embodiment, the PGW 28 may include a processor 30, memory 32, and a RAN congestion control module 34 for facilitating RAN congestion mitigation functionality in accordance with features of embodiments described herein. Similarly, as described in greater detail below, the representative RAN node 17 may include a processor 36, memory 38, and a RAN congestion detection and reporting module 40 for implementing an RCI reporting functionality in accordance with features of embodiments described herein. The PGW 28 may interface with a policy charging rule function ("PCRF") 42, which manages the service policy and provides QoS information for each user session. It will be recognized that the core network 18 may provide a variety of functionality in the system 10, including, for example, one or more of aggregation, user authentication, call control and switching, accounting and charging, service invocation, and gateways.

MME 20 also provides the control plane function for mobility between LTE and 2G/3G access networks, such as GSM Edge Radio Access Network ("GERAN") 44 and Universal Terrestrial Radio Access Network ("UTRAN") 46, with the S3 interface, terminating at MME 20 from the SGSN 24. GERAN 44 is the radio part of GSM/EDGE together with the network that joins the base stations, or Node Bs, and the base station controllers ("BSCs"). GERAN comprises the core of a GSM network through which phone calls and packet data are routed to and from the PSTN and the Internet to and from UE. A mobile phone operator's network comprises one or more GERANs, coupled with UTRANs, in the case of a UMTS/GSM network. UTRAN refers to the Node B's and that make up the Universal Mobile Telecommunications System ("UMTS") radio access network. UTRAN can carry many traffic types from real-time Circuit Switched to IP based Packet Switched. UTRAN enables connectivity between UE and a core network. UTRAN includes multiple Node Bs and several RNCs, each of which provides control functionalities for one or more Node Bs. A Node B and an RNC can be collocated on a single device; however, they are typically implemented separately, with the RNC disposed in a central location for serving multiple Node Bs. The RNC and its corresponding Node Bs are called the Radio Network Subsystem (RNS). A single UTRAN may include more than one RNS.

In one embodiment, the system 10 is implemented in accordance with the Long-Term Evolution ("LTE") standard. E-UTRAN provides the radio access in the LTE network and is designed to improve end-user throughputs and sector capacity and reduce user plan latency, bringing significantly improved user experience with full mobility. With the emergence of IP as the protocol of choice for all types of traffic, LTE provides support for IP-based traffic with end-to-end QoS. E-UTRAN supports various types of services, including web browsing, FTP, video streaming, VoIP, online gaming, real time video, push-to-talk, and push-to-view, for example.

UE 12 can be associated with clients, customers, or end users wishing to initiate a communication in communication system 10 via some network. The term "user equipment" is inclusive of devices used to initiate a communication, such as a computer, a personal digital assistant (PDA), a laptop or electronic notebook, a cellular telephone, an iPhone, an IP phone, or any other device, component, element, or object capable of initiating voice, audio, video, media, or data exchanges within communication system 10. UE 12 may also be inclusive of a suitable interface to the human user, such as a microphone, a display, or a keyboard or other terminal equipment. UE 12 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. On power up, UE 12 can be configured to initiate a request for a connection with a service provider. A user agreement can be authenticated by the service provider based on various service provider credentials (e.g., subscriber identity module ("SIM"), Universal SIM ("USIM"), certifications, etc.). More specifically, a device can be authenticated by the service provider using some predetermined financial relationship.

In general terms, SGW 26 is associated with an SGSN user plane in an IP network. SGW 26 can be configured to route and to forward user data packets, while also acting as the mobility anchor for the user plane during inter-Node B handovers. Additionally, SGW 26 can act as the anchor for mobility between LTE and other 3GPP technologies (i.e., terminating the S4 interface and relaying the traffic between 2G/3G systems and PGW 28 via the S5 interface). For idle-state UEs, SGW 26 can terminate the data path and trigger paging when data arrives for UE 12. SGW 26 can also manage and store UE contexts (e.g., parameters of the IP bearer service, network internal routing information, etc.).

MME 20 can be configured to operate as a control node for the LTE access-network. It further can be responsible for idle mode UE tracking and paging procedures (e.g., including retransmissions). Furthermore, MME 20 can be involved in the bearer activation/deactivation process and can be responsible for choosing SGW 26 for UE 12 at the initial attach (and at time of an intra-LTE handover involving core network node relocation). MME 20 can also be responsible for authenticating the user. MME 20 also provides the control plane function for mobility between LTE and 2G/3G access networks, such as GSM Edge Radio Access Network ("GERAN") 44 and Universal Terrestrial Radio Access Network ("UTRAN") 46, with the S3 interface, terminating at MME 20 from the SGSN 24.

In regard to particular applications involving UE 12, media servers comprising one or more video servers, which can provide streaming video to an individual associated with UE 12 via the Internet 14. For example, an individual could be uploading (or streaming) video over the network to which UE 12 is connected. This could involve technologies such as flip video, webcams, YouTube, and various other video technologies involving any type of uploading and/or streaming video data.

For purposes of illustrating certain example techniques of communication system 10, it is important to understand the communications that may be traversing the network and the congestion that can be caused at various points by such communications. In particular, after a subscriber data session has been established in a conventional fashion between the UE 12 and the Internet 14, data packets from the UE 12 are encapsulated by the RAN node 17 in accordance with GTPv1-U and forwarded on to SGW 26/PGW 28. The SGW 26/PGW 28 decapsulates the user data packets from GTPv1-U tunnel between the RAN node 17 and the SGW 26/PGW 28 and forwards it to Internet 14. Conversely, data packets intended for the UE 12 are transmitted to the UE from the Internet 14 via the PGW 28/SGW 26, which encapsulates the same in accordance in GTPv1-U tunnel towards the RAN node, and the RAN node 17 decapsulates the data packets upon receipt thereof.

Figure 2:
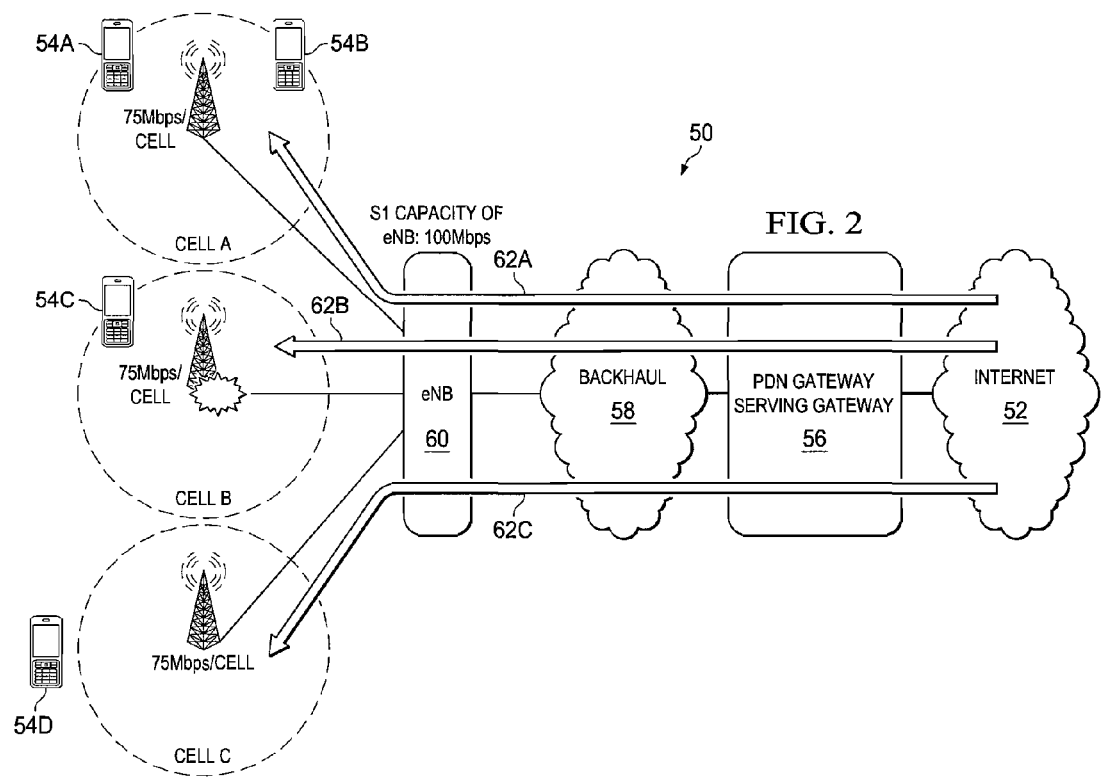
FIG. 2 is a more simplified block diagram of a communication system similar to the communication system shown in FIG. 1 illustrating a state of RAN congestion for one or more subscribers.

Referring now to FIG. 2, illustrated therein is a simplified block diagram of a communications network 50, which is similar to the system 10 except that a RCI reporting functionality is not shown as being implemented in the network 50. In one example, using the network 50, downlink traffic from the Internet 52 and destined for one of a plurality of UEs 54A-54D traverses a PGW/SGW 56 and a backhaul network 58 to a RAN node comprising an eNB 60. The eNB 60 is in communication with a plurality of cells A-C, each of which service one or more of the UEs 54A-54D. As shown in FIG. 2, traffic destined for cell A is represented by an arrow 62A, traffic destined for cell B is represented by an arrow 62B, and traffic destined for cell C is represented by an arrow 62C. It will be assumed for the sake of example that the radio capacity of each cell A-C is 75 Mbps, while the S1 capacity of the eNB 60 is 200 Mbps. Accordingly, assuming downlink data traffic destined for cell A is 100 Mbps, one or more subscribers at UE 54C will experience RAN congestion for the user plane traffic. Such a subscriber will hereinafter be referred to as a "RAN congested subscriber." Currently, the situation is managed by the RAN node throttling traffic based solely on the QoS profile of the radio bearer. This method is deficient in that it fails to take into account the type of application traffic; in other words, it does not provide an application-specific approach to congestion control. Hence, the subscriber will observe a deterioration of Quality of Experience ("QoE") across all the applications the subscriber is using. For example, if the subscriber is simultaneously watching a YouTube video and downloading a file using a file transfer protocol ("FTP") application, the subscriber will experience same level of deterioration of QoE for both of the applications. Additionally, it fails to alleviate congestion in the backhaul network and results in inaccurate accounting, as the subscriber will have already been billed for data packets that end up being discarded at the RAN node.

As more fully described in the aforementioned U.S. patent application Ser. No. 13/551,374, previously incorporated by reference, communication system 10 can address these issues (and others) in offering PGW-based RAN congestion control of user plane traffic. Such a RAN congestion control system allows for application-specific congestion control based on operator policy. For example, operator policy may provide that during periods of RAN congestion, video traffic should be throttled to maintain a high QoE for other applications used by the subscribers. Additionally, such a RAN congestion control system would allow for, during heavy RAN congestion, offloading traffic to a complementary network. Mobile data offloading involves the use of complementary network technologies for delivering data originally targeted for a cellular network. The primary complementary network technologies currently employed for mobile data offloading are WiFi, Femtocell, and Integrated Mobile Broadcast ("IMB"). In general, rules governing the triggering of mobile data offloading may be set by an end-user or an operator. The code for implementing the rules may be resident on UE or a server or may be divided between the two. For end-users, the benefit of mobile data offloading is that it helps control the cost of data service and in most cases, takes advantage of the higher bandwidth that may be available with the complementary network technology. For operators, the benefit of mobile data offloading is the ability to ease congestion in cellular networks as it arises. It is anticipated that other complementary technologies will be developed, due to the continuous surge of mobile data; therefore, when used herein, the term "offloading" is intended to encompass offloading of mobile data using any such complementary technology, whether or not currently in existence.

Access Network Discovery and Selection Function ("ANDSF") is currently a preferred 3GPP approach for controlling offloading between 3GPP and non-3GPP access networks (such as Wi-Fi). The purpose of the ANDSF is to assist user devices to discover access networks in their vicinity and to provide rules (policies) to prioritize and manage connections to all networks.

Using the above-described offloading technology, the RAN congestion control system may trigger a change in Inter-System Routing Policies ("ISRP") via eANDSF to offload a user session or application flow pertaining to specific service, such as YouTube or Facebook video, to a nearby WiFi network. In another example, the user session could be offloaded to a Femtocell. In this manner, the system 10 also provides for more accurate accounting and charging functionality than an approach in which data is throttled at the RAN node during a congestion condition, due to the fact that application-aware intelligent congestion control takes place at the PGW rather than at the RAN node, which cannot perform such an operation, as described in greater detail below. Finally, the communication system 10 also provides congestion control for downlink traffic at the edge of the core network 18, thereby preventing overloading of the backhaul network because traffic is throttled before entering the backhaul network.

Referring again to FIG. 1, in one embodiment, in the system 10, the RAN congestion control module 34 at the PGW 28 monitors a "congestion header" (described below) in the uplink GTP-U data stream to determine whether the subscriber associated with UE 12 is experiencing RAN congestion in uplink or downlink direction; that is, whether the subscriber is a RAN congested subscriber. In accordance with features of an embodiment, the RAN congestion detection and reporting module 40 at the RAN node 17 determines for each subscriber whether the subscriber is a congested subscriber and marks uplink GTPv1-U packets of each congested subscriber to enable the PGW 28 to identify the subscriber session experiencing the congestion and to take appropriate remedial action. The marking of the uplink GTPv1-U packets is achieved using a newly—defined GTPv1-U extension header type, referred to as the RAN Congestion Level Indicator ("RCLI") extension header. The RCLI extension header contains a value representing the RAN congestion level, for user plane traffic, currently being experienced by the subscriber and the direction of any such congestion.

Based on operator policy as defined in the PCRF 42, the PGW 28 can apply appropriate congestion control action based on the value of the RCLI. Such action may include notifying one or more entities, which entities may then take remedial action. Such remedial action may include, for example, application-specific activities, such as throttling video for a period of time, or may include triggering a change in IRSP (via eANDSF), to offload designated traffic to a complementary network technology, such as a WiFi network. As a result, RAN congestion can be eased without deterioration of user experience for other applications.

MOCN has been defined as a type of network sharing in which only the RAN is shared between two or more core network operators. RAN sharing is not simply a method of reducing costs; it ushers in a new paradigm in network rollout strategy. In particular, there are a variety of situations in which enhanced RAN sharing may be useful. One such situation is in connection with what is commonly referred to as a Greenfield deployment. In a Greenfield deployment, two network operators jointly agree to build out RAN using a new technology (e.g., 4G). At the outset, the new shared network infrastructure and operations can be based on capacity and coverage requirements of both operators. The operators can fund the new network 50:50 or according to their expected needs. Another situation in which RAN sharing may be beneficial is one in which one of the sharing operators has already built a RAN (such as a 4G network, for example) and is looking for another operator to share, or buy into, the network. In this case, the second operator would either pay a capacity usage fee or an up-front fee to acquire access to the network. Yet another situation in which RAN sharing may prove useful is one in which one or more 2G, 3G and/or 4G networks that have already built out by each of the sharing operators need to be consolidated into a single joint network. This type of network sharing usually holds significant cost advantages, but it also presents substantial design challenges.

It will be noted that at least two types of network sharing scenarios currently exist, including Multi-Operator Core Network ("MOCN") and Gateway Core Network ("GWCN"). The remainder of this disclosure is described with reference to and in the context of the MOCN environment; however, it will be recognized that the teachings herein are equally applicable to GWCN environments.

Figure 3:
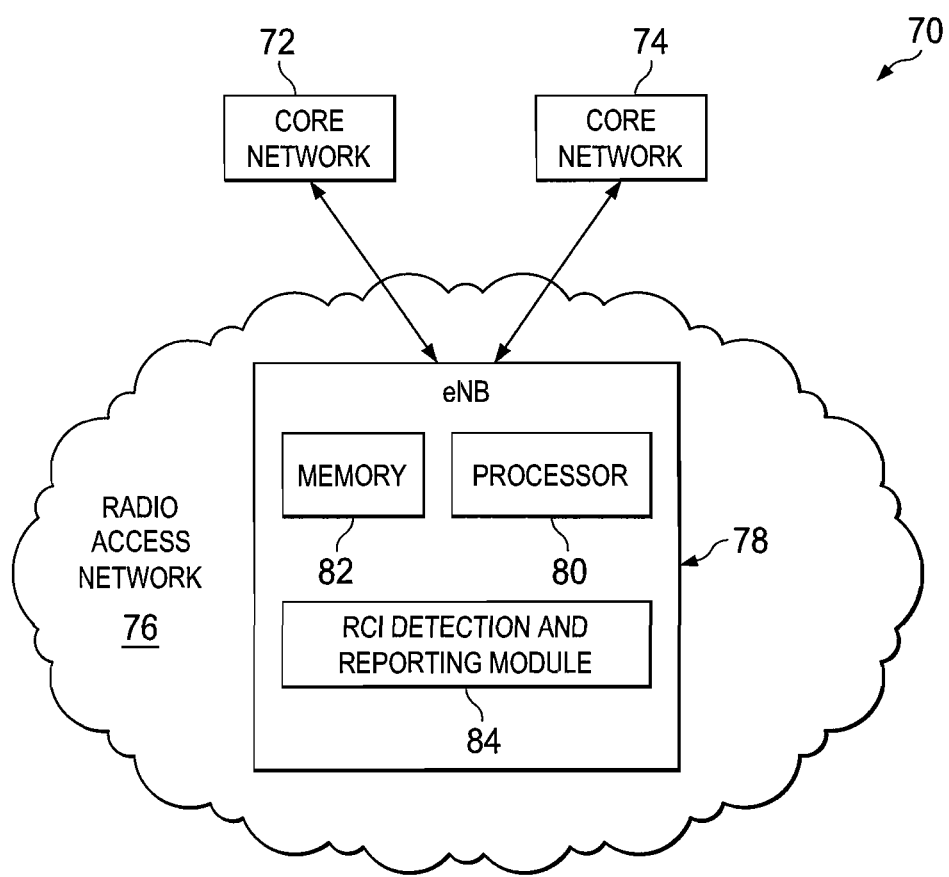
FIG. 3 is a block diagram illustrating a MOCN-type network sharing environment in accordance with an embodiment of the present disclosure.

Accordingly, FIG. 3 is a simplified block diagram of a MOCN-type network sharing environment in accordance with an embodiment of the present disclosure. As shown in FIG. 3, an MOCN 70 includes at least two core networks 72 and 74 connectable to a RAN network 76, which comprises a RNC, such as an eNB 78. Each of the core networks 72, 74 is operated by a different PLMN operator. For example, in one embodiment, core network 72 is operated by PLMN A and core netowk 74 is operated by PLMN B. It will be assumed for the sake of example herein that the RAN 76 is owned by PLMN B, but is used by both PLMN A and PLMN B to service their respective users. The eNB 78 may include a processor 80, memory 82, and a RAN congestion detection and reporting module 84 for implementing an RCI reporting functionality in accordance with features of embodiments described herein. It should be noted that, although the MOCN 70 as illustrated in FIG. 3 includes only two core networks/operators, additional core networks operated by different operators may also share the capacity of the RAN 76.

Network sharing scenarios in which a RAN, such as RAN 76, is shared among multiple Public Land Mobile Network ("PLMN") operators have special considerations that must be taken into account by congestion reporting solutions, such as the GTP-U based congestion reporting solution described in the above-noted U.S. patent application Ser. No. 13/551,374, previously incorporated by reference herein. For example, if a particular eNB is being shared by two PLMNs, e.g., PLMN A and PLMN B, in a manner in which each of PLMN A and PLMN B operates an independent core network, and the shared eNB experiences congestion, then without prior explicit consent, PLMN B should not receive RCI concerning PLMN A's subscribers at eNB. Similarly, in the same scenario, PLMN A should not receive RCI concerning PLMN B's subscribers at eNB (again, absent prior explicit consent). Such explicit consent will be governed by a Service Level Agreements ("SLAs") between network sharing operators, in this case, PLMN A and PLMN B.

At this point, a brief discussion of how a shared eNB distinguishes the subscribers, or UEs, of one PLMN from those of another PLMN is deemed instructive. In particular, eNBs route requests from a UE at the AS layer, based on a Globally Unique Mobility Management Entity Identifier ("GUMMEI"), which includes a PLMN identifier, a Mobility Management Entity Group Identifier ("MMEGI"), and a Mobile Management Entity ("MME") code. The MME code is used in the eNB by a Non-Access Stratum ("NAS") node selection function to select the MME. Each operator is assigned a unique PLMN identifier, which comprises a Mobile Country Code ("MCC") and a Mobile Network Code ("MNC"), required to be registered with ITU-T. An operator may have one or more PLMNs depending on the zones/regions in which is permitted to operate. The GUMMEI is provided by a UE during Radio Resource Control ("RRC") requests. In this manner, based on the GUMMEI provided, eNB can distinguish subscribers/UEs belonging to one PLMN from those belonging to another PLMN.

Different types of MOCN configurations are to be expected in conjunction with different RAN-sharing agreements (which may be documented in SLAB) between or among operators. A first example configuration ("Configuration 1") is a homogenous configuration in which an eNB has two sectors and a first one of those sectors ("Sector 1") is for a first PLMN ("PLMN 1"), but serves a second PLMN ("PLMN 2") as well and a second one of the sectors ("Sector 2") is for PLMN 2 but also serves PLMN 1. It will be assumed that in Configuration 1, pursuant to an SLA between PLMN 1and PLMN 2, PLMN 2 is only to be informed of congestion in Sector 1 if its subscribers are in Sector 1. Configuration 1 covers the Public Safety roaming case in which the Public Safety spectrum is treated as separate sector. This is typically one-way sharing; commercial users would generally not roam onto the Public Safety sector. Configuration 1 is a special case of Configuration 2 (below), and will therefore not be further addressed in detail.

A second example configuration ("Configuration 2") is another homogenous configuration in which the entire capacity of a shared eNB is split between two PLMNs, such that X % of the capacity of the shared eNB is dedicated for use by subscribers of PLMN 1and Y % (where Y=100−X) of the capacity of the shared eNB is dedicated for use by subscribers of PLMN 2. When either PLMN 1PLMN 1 or PLMN 2 reaches a designated threshold (i.e., becomes congested), that and only that PLMN should be notified of user plane congestion at the shared eNB.

A third example configuration ("Configuration 3") is yet another homogenous configuration in which the capacity of every eNB in a RAN is apportioned in such a manner that X % of the air interface resources is reserved for subscribers to PLMN 1, X % of the air interface resources is reserved for subscribers to PLMN 2, and the remaining Y % (where Y=100-2x) of the air interface resources is shared between subscribers to either PLMN 1 or PLMN 2. A fourth example configuration ("Configuration 4") is a heterogeneous configuration comprising a combination of Configuration 2 and Configuration 3. In Configuration 4, at least one eNB supports subscribers of both PLMN 1and PLMN 2 such that X % of the air interface resources is reserved for each of PLMN 1and PLMN 2 and the remaining Y % (where Y=100-2x) of the air interface resources is shared between subscribers to either PLMN 1 or PLMN 2. The remainder of the eNBs in the RAN also support subscribers of both PLMN 1and PLMN 2, but 100% of the capacity is shared (as opposed to X % being dedicated to one PLMN and the remaining (100-X %) being dedicated to the other, in the case of an eNB shared by two operators).

Although four configurations are described hereinabove, it will be recognized that there are any number of different RAN sharing scenarios and configurations, all of which may be defined and governed by SLAs between/among the PLMN operators sharing a RAN. As previously noted, U.S. patent application Ser. No. 13/551,374 presents a GTP-U approach for implementing a mechanism for reporting RAN congestion information ("RCI"). The disclosure set forth herein focuses on what is reported, to whom, and when in various instances of RAN user plane congestion/RAN sharing configurations.

FIG. 4 illustrates a RCI reporting table 90 that may be maintained by an eNB shared by two or more PLMN operators, such as the eNB 78, for controlling to whom and under what circumstances RCI is reported in accordance with an embodiment. The table 90 corresponds to, and illustrates a specific example implementation of, Configuration 2. As shown in FIG. 4, the table 90 includes a PLMN identification column 92, a Dedicated section 94 comprising multiple columns, and a Shared section 96 comprising multiple columns. Each of the sections 94, 96, includes a Capacity column 98, 100, an RCI Reporting Start column 102, 104, an RCI Reporting Stop column 106, 108, and a PLMN to Receive RCI Reporting column 110, 112. The Shared section 96 also includes an identity of Sharing PLMN column 114.

The PLMN ID column 92 includes entries identifying (individually) the PLMNs sharing the eNB to which the table 90 corresponds. Each entry in the Capacity column 98 specifies the amount of eNB capacity dedicated to the corresponding PLMN. Each entry in the Capacity column 100 specifies the amount of eNB capacity shared by the corresponding PLMN with the PLMN indicated in the corresponding entry in column 114. Each entry in the RCI Reporting Start column 102 indicates a threshold at which RCI reporting should start with respect to dedicated capacity for the corresponding PLMN. Similarly, each entry in RCI reporting start column 104 indicates a threshold at which RCI reporting should start with respect to shared capacity for the corresponding PLMN. Each entry in the RCI Reporting Stop column 106 indicates a threshold at which RCI reporting should start with respect to dedicated capacity for the corresponding PLMN. Similarly, each entry in the RCI Reporting Stop column 108 indicates a threshold at which RCI reporting should start with respect to shared capacity for the corresponding PLMN. Each entry in the PLMN to Receive RCI Reporting column 110 designates the PLMN(s) to which RCI should be reported once the threshold specified in column 102 is reached. Similarly, each entry in the PLMN to Receive RCI Reporting column 112 designates the PLMN(s) to which RCI should be reported once the threshold specified in column 104 is reached.

As previously noted, table 90 corresponds to a specific example of Configuration 2. It will be assumed for the sake of example that 60% of the capacity of each eNB is dedicated for use by users of PLMN A and the remaining 40% of the capacity of each eNB is dedicated for use by users of PLMN B. It will be further assumed that PLMN B owns the subject eNB, which PLMN A is sharing. As shown in column 102, RCI reporting will start with respect to PLMN A when subscribers of PLMN A are using 45% of the capacity of eNB; as indicated in column 110, both PLMN A and PLMN B will receive RCI reports with respect to dedicated capacity of PLMN A. Similarly, as also shown in column 102, RCI reporting will start with respect to PLMN B when subscribers of PLMN B are using 25% of the capacity of eNB; as indicated in column 110, only PLMN B (which is the owner of the RAN/eNBs) will receive RCI reports with respect to dedicated capacity of PLMN B. RCI reporting will cease with respect to PLMN A when consumption by subscribers of PLMN A falls below 35% (column 106). Similarly, RCI reporting will cease with respect to PLMN B when consumption by subscribers of PLMN B falls below 20% (column 106).

FIG. 5 illustrates a RCI reporting table 120 that may be maintained by an eNB shared by two or more PLMN operators, such as the eNB 78, for controlling to whom and under what circumstances RCI is reported in accordance with an embodiment. The table 120 corresponds to, and illustrates a specific example implementation of, Configuration 3. As shown in FIG. 5, table 120 includes sections 124, 126, and columns 122 and 128-144 that correspond to sections 94, 96, and columns 92 and 98-114, of table 90 (FIG. 4).

As previously noted, table 120 corresponds to a specific example of Configuration 3. It will be assumed for the sake of example that there are two PLMNs, designated PLMN A and PLMN B, sharing an eNB with which the table 120 is associated. It will be further assumed that the business agreement between PLMNs A and B is as follows. (1) B owns the RAN resources; (2) PLMN A leases a certain amount of dedicated capacity from PLMN B's RAN for its users; (3) PLMN A doesn't want PLMN B to be notified of RAN congestion caused due to its own users' activities (and likely wants to deal with congestion mitigation on its own); and (4) PLMN A shares a certain capacity for its users with that of PLMN B's users and therefore consents to providing notification of RAN congestion to PLMN B, in addition to itself, due to its own users' activities.

PLMN A and PLMN B share RAN resources such that (1) PLMN A gets 30% of dedicated capacity on a given eNB; (2) PLMN B gets 30% of dedicated capacity on that eNB; and (3) both PLMN A and PLMN B share remainder 40% of capacity on that eNB. When PLMN A's dedicated capacity on eNB exceeds a designated threshold (e.g., 25%), PLMN A receives RCI of affected users and various network nodes in PLMN A's core network take appropriate mitigation measures, such as reducing the video streaming rate of affected users, removing certain bearers or PDN connections, etc. As a result of the mitigation measures, when PLMN A's dedicated capacity on eNB is reduced to 20%, RCI reporting toward PLMN A is stopped. Similarly, with regard to PLMN B, when PLMN B's dedicated capacity on eNB exceeds a designated threshold (e.g., 25%), PLMN B receives RCI of affected users and various network nodes in PLMN B's core network take appropriate mitigation measures, such as reducing the video streaming rate of affected users, removing certain bearers or PDN connections, etc. As a result of the mitigation measures, when PLMN B's dedicated capacity on eNB is reduced to 20%, RCI reporting toward PLMN B is stopped.

With regard to shared capacity of the eNB, for both PLMN A and PLMN B, when the shared capacity exceeds a designated threshold (e.g., 30%), both PLMN A and PLMN B receive RCI notification of affected users and various network nodes in PLMN A's and PLMN B's core networks take appropriate mitigation measures, such as reducing the video streaming rate of affected users, removing certain bearers or PDN connections, etc. As a result of the mitigation measures, when the shared capacity on eNB is frees up to 20%, RCI reporting toward PLMN A and PLMN B is stopped.

The foregoing is represented in table 120 as follows. As shown in column 132, RCI reporting will start with respect to PLMN A when subscribers of PLMN A are using 25% of the capacity of eNB; as indicated in column 140, only PLMN A will receive the RCI reports with respect to dedicated capacity of PLMN A. Similarly, as also shown in column 132, RCI reporting will start with respect to PLMN B when subscribers of PLMN B are using 25% of the capacity of eNB; as indicated in column 140, only PLMN B will receive RCI reports with respect to dedicated capacity of PLMN B. RCI reporting will cease with respect to PLMN A when consumption by subscribers of PLMN A falls below 20% (column 136). Similarly, RCI reporting will cease with respect to PLMN B when consumption by subscribers of PLMN B falls below 20% (column 136).

With regard to shared capacity, as shown in column 134, RCI reporting will start with respect to PLMN A when subscribers of PLMN A are using 30% of the shared capacity of eNB; as indicated in column 142, both PLMN A and PLMN B will receive RCI reports with respect to PLMN A's subscribers' shared capacity usage. Similarly, as also shown in column 132, RCI reporting will start with respect to PLMN B when subscribers of PLMN B are using 30% of the shared capacity of eNB; as indicated in column 142, only PLMN B will receive RCI reports with respect to PLMN B's subscribers' shared capacity usage. RCI reporting will cease with respect to shared capacity usage of PLMN A when consumption by subscribers of PLMN A falls below 25% (column 138). Similarly, RCI reporting will cease with respect to shared capacity usage of PLMN B when consumption by subscribers of PLMN B falls below 25% (column 138).

The tables 90, 120, may be stored in memory 82 of eNB 78. It should be noted that, the reporting table(s) may be maintained in a central location within the RAN and accessible by the eNBs, rather than directly on the eNBs, as illustrated and described herein.

Figure 6:
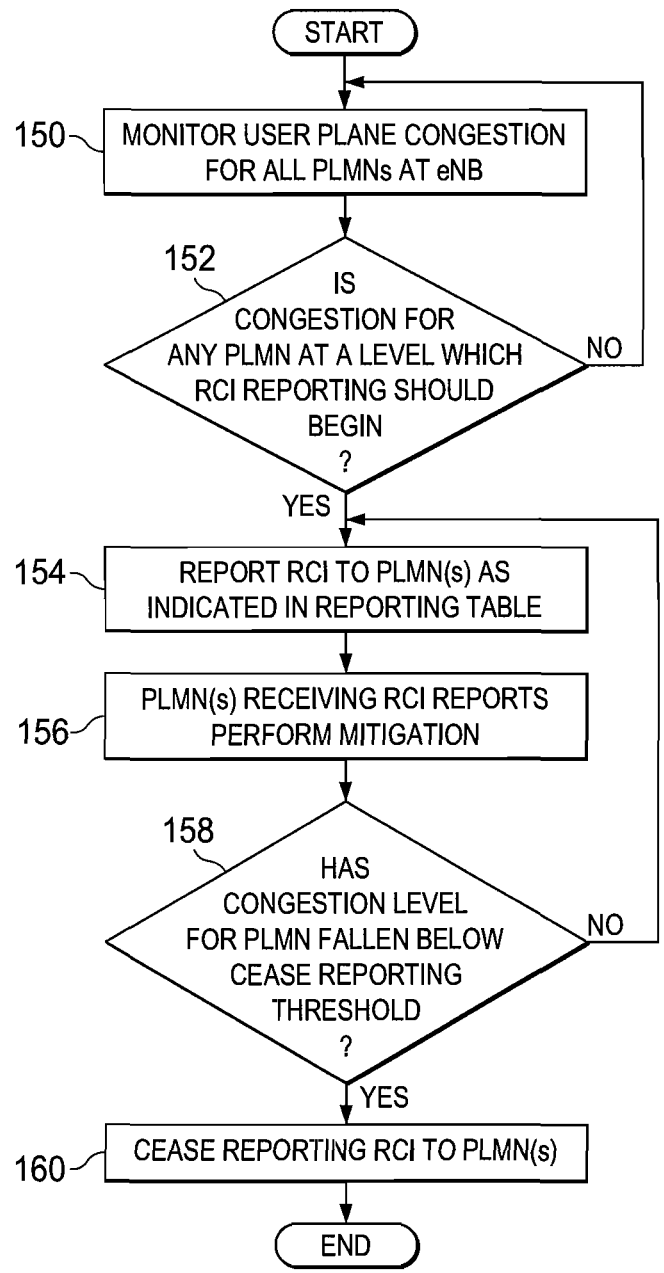
FIG. 6 is a flowchart illustrating logic for implementing a technique for reporting RCI a technique for reporting RCI in a network sharing environment, such as an MOCN, in accordance with an embodiment of the present disclosure.

FIG. 6 illustrates a flowchart of logic executed at the eNB node 78, (using the processor 80, memory 82, and RCI reporting module 84) for reporting RCI to a designated PLMN operator as specified in an agreement between PLMNs sharing a RAN in accordance with one embodiment. Referring to FIG. 6, in step 150, user plane congestion at the eNB is monitored for all PLMNs sharing the RAN. It will be recognized that there are any number of method of detecting subscriber congestion at the eNB and that any one of these is acceptable for implementing step 150. In step 152, a determination is made whether congestion is at a level at which RCI reporting should begin with respect to one of the PLMN operators. It will be recognized that this determination is made with reference to the reporting table; specifically, the RCI reporting start column for the particular operator for either dedicated or shared capacity. If a negative determination is made in step 152, execution returns to step 150. If a positive determination is made in step 152, execution proceeds to step 154, in which RCI is reported to the PLMN operator(s) as indicated in the reporting table. Using the table 120 as an example, assuming in step 152, it is determined that usage of shared capacity by subscribers of PLMN A exceeds 30%, in step 154, RCI will be reported to both PLMN A and PLMN B.

In step 156, the notified PLMN operator(s) will take mitigating action to reduce user plane RAN congestion. Such mitigating action may include, for example, such as reducing the video streaming rate of affected users, removing certain bearers or PDN connections, etc. In step 158, a determination is made whether congestion has fallen back below the corresponding cease reporting threshold. If so, execution proceeds to step 160 and reporting to the PLMN operator(s) ceases; otherwise, execution returns to step 154 and RCI reporting continues in the manner indicated in the table. Continuing with the example started above with reference to table 120, in step 158, a determination is made whether the usage of shared capacity by subscribers of PLMN A has fallen below 25%. If so, in step 160, RCI reporting to PLMNs A and B is stopped; otherwise, in step 154, it continues.

Referring to FIGS. 5 and 6 simultaneously, and this time with reference to dedicated capacity, assuming in step 152, a determination is made that the congestion level in connection with the dedicated capacity for PLMN B has exceeded the designated threshold (25%). In step 154, per the table 120, RCI reporting to PLMN A and PLMN B begins. In step 156, the core networks of both PLMNs perform mitigation. In step 158, a determination is made whether congestion for PLMN B users has fallen below a designated threshold (20%). If not, reporting and mitigation continue in steps 154 and 156; otherwise, in step 160, reporting ceases.

Note that in certain example implementations, the RCI reporting logic for user plane traffic functions outlined herein may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element, as shown in FIG. 1, can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor, as shown in FIG. 1, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

In one example implementation, eNB 78 includes software in order to achieve the RCI reporting functionality outlined herein. These activities can be facilitated by module 84. eNB 78 can include memory elements for storing information to be used in achieving the RCI reporting functionality outlined herein. Additionally, each of these devices may include a processor that can execute software or an algorithm to perform the RCI reporting activities as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

In a separate endeavor, communication system 10 can generally be configured or arranged to represent the LTE architecture, the 3G architecture applicable to UMTS environments, or any suitable networking system or arrangement that provides a communicative platform for communication system 10. In other examples, FIG. 1 could readily include an SGSN, a gateway GPRS support node (GGSN), any type of network access server, network node, etc. Moreover, the present disclosure is equally applicable to other cellular and/or wireless technology including CDMA, Wi-Fi, WiMax, etc.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain backhaul links, AAA, and authentication protocols, communication system 10 may be applicable to other exchanges, routing protocols, authentication protocols, or routed protocols in which packets (not necessarily the routing protocol/packets described) are exchanged in order to provide RAN congestion level indication for user plane traffic activities. In addition, other example environments that could use the features defined herein include Pico architectures, where an appropriate RAN congestion level indication for user plane traffic could occur for UE 12.

What is claimed is:

1. A method, comprising:
   detecting user plane congestion at an eNodeB in connection with subscribers of a first one of a plurality of public land management networks ("PLMNs") sharing a radio access network ("RAN");
   identifying one or more of the PLMNs to be notified of the detected congestion as specified by a Service Level Agreement among the PLMNs, wherein the SLA identifies which of the PLMNs are authorized to receive notification of RAN congestion information ("RCI") regarding the congestion detected in connection with subscribers of the first one of the PLMNs;
   reporting RCI regarding the detected congestion to only the identified one or more of the PLMNs.

2. The method of claim 1, wherein the detecting comprises:
   determining whether detected user plane congestion exceeds a first congestion threshold indicated for the first one of the PLMNs.

3. The method of claim 2, wherein the first congestion threshold is indicated in a table associated with the eNodeB.

4. The method of claim 1 further comprising:
   terminating the RCI reporting when the detected congestion falls below a second congestion threshold specified for the first one of the PLMNs.

5. The method of claim 2, wherein the second congestion threshold is indicated in a table associated with the eNodeB.

6. The method of claim 1, wherein the identified one or more of the PLMNs comprises the first one of the PLMNs.

7. The method of claim 1, wherein the identified one or more of the PLMNs comprises an owner of the RAN.

8. The method of claim 1, wherein the identifying comprises referring to an entry in a table associated with the eNodeB, wherein the entry corresponds to the first one of the PLMNs.

9. One or more non-transitory tangible media that includes code for execution and when executed by a processor is operable to perform operations comprising:
   detecting user plane congestion at an eNodeB in connection with subscribers of a first one of a plurality of public land management networks ("PLMNs") sharing a radio access network ("RAN");
   identifying one or more of the PLMNs to be notified of the detected congestion as specified by a Service Level Agreement among the PLMNs, wherein the SLA identifies which of the PLMNs are authorized to receive notification of RAN congestion information ("RCI") regarding the congestion detected in connection with subscribers of the first one of the PLMNs;
   reporting RCI regarding the detected congestion to only the identified one or more of the PLMNs.

10. The non-transitory tangible media of claim 9, wherein the detecting comprises:
    determining whether detected user plane congestion exceeds a first congestion threshold indicated for the first one of the PLMNs.

11. The non-transitory tangible media of claim 9 further operable to perform operations comprising:
terminating the RCI reporting when the detected congestion falls below a second congestion threshold specified for the first one of the PLMNs.

12. The non-transitory tangible media of claim 9, wherein the identified one or more of the PLMNs comprises at least one of the first one of the PLMNs and an owner of the RAN.

13. The non-transitory tangible media of claim 9, wherein the identifying comprises referring to an entry in a table associated with the eNodeB, wherein the entry corresponds to the first one of the PLMNs.

14. An apparatus comprising:
a memory element configured to store data;
a processor operable to execute instructions associated with the data; and
a RCI reporting module configured to:
detect user plane congestion at an eNodeB in connection with subscribers of a first one of a plurality of public land management networks ("PLMNs") sharing a radio access network ("RAN");
identify one or more of the PLMNs to be notified of the detected congestion as specified by a Service Level Agreement among the PLMNs, wherein the SLA identifies which of the PLMNs are authorized to receive notification of RAN congestion information ("RCI") regarding the congestion detected in connection with subscribers of the first one of the PLMNs;
report RCI regarding the detected congestion to only the identified one or more of the PLMNs.

15. The apparatus of claim 14, wherein the detecting comprises:
determining whether detected user plane congestion exceeds a first congestion threshold indicated for the first one of the PLMNs.

16. The apparatus of claim 14, wherein the RCI reporting module is further configured to terminate the RCI reporting when the detected congestion falls below a second congestion threshold specified for the first one of the PLMNs.

17. The apparatus of claim 14, wherein the identified one or more of the PLMNs comprises the first one of the PLMNs.

18. The apparatus of claim 14, wherein the identified one or more of the PLMNs comprises an owner of the RAN.

19. The apparatus of claim 14, wherein the identifying comprises referring to an entry in a table associated with the eNodeB, wherein the entry corresponds to the first one of the PLMNs.

* * * * *